United States Patent
Han et al.

(10) Patent No.: US 12,503,525 B2
(45) Date of Patent: *Dec. 23, 2025

(54) BIPHENOL METAL COMPLEX, PREPARATION METHOD THEREFOR AND USE THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Shuliang Han, Beijing (CN); Haokun Li, Beijing (CN); Wenbo Song, Beijing (CN); Zhao Jin, Beijing (CN); Lusheng Wang, Beijing (CN); Yuanyuan Fang, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 808 days.

This patent is subject to a terminal disclaimer.

(21) Appl. No.: 17/772,262

(22) PCT Filed: Oct. 28, 2020

(86) PCT No.: PCT/CN2020/124376
§ 371 (c)(1),
(2) Date: Apr. 27, 2022

(87) PCT Pub. No.: WO2021/083207
PCT Pub. Date: May 6, 2021

(65) Prior Publication Data
US 2022/0380397 A1 Dec. 1, 2022

(30) Foreign Application Priority Data

Oct. 28, 2019 (CN) .......................... 201911032074.2
Oct. 28, 2019 (CN) .......................... 201911032096.9
(Continued)

(51) Int. Cl.
*C07F 17/00* (2006.01)
*C08F 4/64* (2006.01)
(Continued)

(52) U.S. Cl.
CPC .......... *C08F 4/64079* (2013.01); *C07F 17/00* (2013.01); *C08F 4/6428* (2013.01); *C08F 10/02* (2013.01); *C08F 2420/07* (2021.01)

(58) Field of Classification Search
CPC ....................................................... C07F 17/00
See application file for complete search history.

(56) References Cited

U.S. PATENT DOCUMENTS

| 6,706,827 B1 | 3/2004 | Lyu et al. |
| 2004/0143077 A1 | 7/2004 | Lyu et al. |

(Continued)

FOREIGN PATENT DOCUMENTS

| CN | 1955200 A | 5/2007 |
| CN | 101092459 A | 12/2007 |

(Continued)

OTHER PUBLICATIONS

T. Wang et al., 39 Chemical Journal of Chinese Universities, 2586-2593 (2018) (with English-language machine translation) (Year: 2018).*

(Continued)

*Primary Examiner* — Alexander R Pagano
(74) *Attorney, Agent, or Firm* — FINNEGAN, HENDERSON, FARABOW, GARRETT & DUNNER LLP

(57) ABSTRACT

Disclosed is a biphenol metal complex. The structure thereof is as represented by formula I, wherein $R_1$ and $R_1'$ are each independently selected from hydrogen and a substituted or unsubstituted $C_1$-$C_{20}$ hydrocarbyl; $R_3$-$R_7$, $R_3'$-$R_7'$ are each independently selected from hydrogen and a substituted or unsubstituted $C_1$-$C_{20}$ hydrocarbyl, any two adjacent groups of $R_3$-$R_7$ are optionally linked to form a ring, and any two adjacent groups of $R_3'$-$R_7'$ are also optionally linked to form a ring; M and M' are each independently selected from the Group 4 metals; each X is independently selected from the group consisting of a hydrocarbyl having 1 to 20 carbon atoms, hydride, amido, alkoxide, alkyl sulfide, alkyl phosphide, halide, diene, amine, phosphine, ether, and combinations thereof; m and n are independently an integer of from 1 to 4; and L is a divalent linking group.

(Continued)

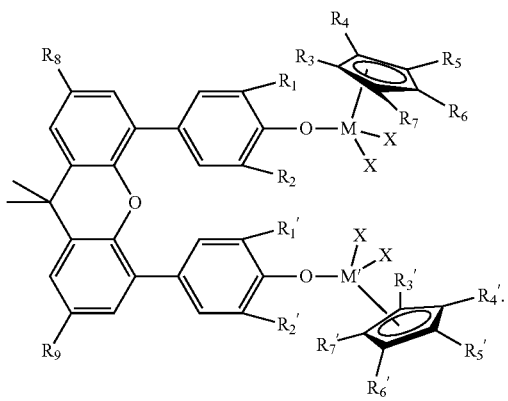

Formula I

10 Claims, No Drawings

(30) Foreign Application Priority Data

| Oct. 28, 2019 | (CN) | 201911032105.4 |
| Oct. 28, 2019 | (CN) | 201911033274.X |
| Oct. 28, 2019 | (CN) | 201911033277.3 |

(51) Int. Cl.
  *C08F 4/642* (2006.01)
  *C08F 10/02* (2006.01)

(56) References Cited

U.S. PATENT DOCUMENTS

| 2008/0200708 A1* | 8/2008 | Damrau | C08F 10/00 |
| | | | 556/52 |
| 2016/0130372 A1* | 5/2016 | Do | C08F 210/16 |
| | | | 526/133 |
| 2022/0372177 A1* | 11/2022 | Song | C08F 110/02 |

FOREIGN PATENT DOCUMENTS

| CN | 101798361 A | | 8/2010 |
| CN | 101864010 A | | 10/2010 |
| CN | 101864040 A | | 10/2010 |
| CN | 102268032 A | | 12/2011 |
| CN | 104693327 A | * | 6/2015 |
| CN | 104725533 A | | 6/2015 |
| CN | 108191907 A | | 6/2018 |
| CN | 110386955 A | | 10/2019 |
| CN | 110386957 A | | 10/2019 |
| EP | 964004 A1 | * | 12/1999 ............. C08F 10/00 |
| JP | 2000007724 A | | 1/2000 |
| JP | 2004231846 A | | 8/2004 |
| JP | 2006509868 A | | 3/2006 |
| JP | 2007119435 A | | 5/2007 |
| JP | 2008542516 A | | 11/2008 |
| RU | 2317306 C2 | | 2/2008 |
| RU | 2670752 C2 | | 10/2018 |
| WO | WO 200452980 A1 | | 6/2004 |
| WO | WO 2013064235 A1 | | 5/2013 |
| WO | WO 2019070889 A1 | | 4/2019 |

OTHER PUBLICATIONS

M. McNevin et al., 43 Inorganic Chemistry, 8574-8554 (2004) (Year: 2004).*
L Zhang et al., 856 Journal of Organometallic Chemistry, 50-55 (2018) (Year: 2018).*
L. Zhang et al., A novel tridentate [ONS] binuclear titanium complex bearing oxo-bridged macrocyclic structure for ethylene polymerization, *Journal of Organometallic Chemistry*, 856, pp. 50-55 (2018).
T. Wang et al., Synthesis of Oxygen-bridged Binuclear Titanium and Nickel Complexes and Application in Catalysis of Bimodal Polyethylene, *Chemical Journal of Chinese University*, vol. 39, No. 11, pp. 2586-2593 (2018).
Extended European Search Report in counterpart European Patent Application No. EP20881486.3 dated Oct. 30, 2023.
Extended European Search Report in counterpart European Patent Application No. EP20882922.6 dated Oct. 30, 2023.
Kotohiro Nomura et al., Olefin Polymerization by (Cyclopentadienyl)(aryloxy)titanium(IV) Complexes-Cocatalyst Systems, *Macromolecules*, vol. 31, Issue 22, pp. 7588-7597 (1998).
Hongbo Li et al., Nuclearity and cooperativity effects in binuclear catalysts and cocatalysts for olefin polymerization, *Proceedings of the National Academy of Sciences*, vol. 103 Issue 42, pp. 15295-15302 (2006).
Michael J. Mcnevin et al., Dititanium Complexes of Preorganized Binucleating Bis(amidinates), *Inorganic Chemistry*, 43(26), pp. 8547-8554 (2004).
Li Zhang et al., A novel tridentate [ONS] binuclear titanium complex bearing oxo-bridged macrocyclic structure for ethylene polymerization, *Journal of Organometallic Chemistry*, vol. 856, pp. 50-55 (2017).
Tieshi Wang et al., Synthesis of Oxygen-bridged Binuclear Titanium and Nickel Complexes and Application in Catalysis of Bimodal Polyethylene, *Chemical Journal of Chinese Universities*, 39(11), pp. 2586-2593 (2018).
International Search Report and Written Opinion of International Application No. PCT/CN2020/124376, mailed Jan. 8, 2021.
Shuliang Han et al., Binuclear Heteroligated Titanium Catalyst Based on Phenoxyimine Ligands: Synthesis, Characterization, and Ethylene (Co)polymerization, *Macromolecules*, 45(10), pp. 4054-4059, 2012.

* cited by examiner

BIPHENOL METAL COMPLEX, PREPARATION METHOD THEREFOR AND USE THEREOF

CROSS REFERENCE OF RELATED APPLICATIONS

This application is a national stage filing under 35 U.S.C. § 371 of International Application No. PCT/CN2020/124376, filed Oct. 28, 2020, which claims the priority to and benefits of Chinese Patent Application No. 201911032105.4, 201911033274.X, 201911032074.2, 201911032096.9, and 201911033277.3, filed Oct. 28, 2019, all of which are incorporated herein by reference.

TECHNICAL FIELD

The invention relates to a bisphenol metal complex and a preparation method and application thereof, and belongs to the field of organic synthesis.

BACKGROUND ART

The application of coordination polymerization catalysts represented by Ziegler-Natta catalysts has promoted the rapid development of the polyolefin industry. Nowadays, the development of metal catalysts for solution polymerization has become one of the research hotspots in the field of coordination polymerization, and phenol ligand-based transition metal catalysts belong to one class of them. This class of catalyst has good catalytic activity for olefin polymerization. For example, a 2,6-diisopropyl phenoxy titanium catalyst has successfully realized the homopolymerization of ethylene to afford linear polyethylene (Nomura K, Naga N, Miki M, et al., *Macromolecules* 1998, 31, 7588 -7597), and when used in the copolymerization of ethylene and an α-olefin, a copolymer with high α-olefin content can be obtained, which can be a thermoplastic elastomer.

At the same time, based on the research results of active enzyme catalysis, synergistic catalysts have been gradually developed. Researches have revealed that when double zirconium metal catalysts are used, the ethylene polymerization activity and the molecular weight of the resulting polymer are comparative to those obtained when single zirconium metal catalysts are used, but an ethyl grafting rate in the polymer chain is much higher, reaching 12 %, while the ethyl grafting rate in the polymer obtained by using the single zirconium metal catalysts to catalyze ethylene polymerization is only 1.1%. At the same time, when the double zirconium metal catalysts are used, the ethyl grafting rate (12 %) in the polymer obtained by using a double boron cocatalyst is also higher than the ethyl grafting rate (2.7%) in the polymer obtained by using a single boron cocatalyst (Li, H.; Marks, T. J. *Proc. Natl. Acad. Sci.* 2006, 103, 15295).

CN201010204671.1 discloses the homopolymerization of ethylene and the copolymerization of ethylene with monomers such as hexene and octene using a double titanium metal catalyst. The polymerization activity under normal pressure is on the order of $10^4 \, g \cdot mol^{-1}(Ti) \cdot h^{-1}$, the molecular weight of the copolymer is about 300,000, and the molecular weight distribution is greater than 2.

There is still a need in the art to develop novel metal compounds exhibiting desired catalytic performance.

SUMMARY OF THE INVENTION

The inventors have conducted diligent researches and, as a result, found that when used in olefin polymerization, a class of bisphenol metal complexes exhibit high catalytic efficiency and high comonomer incorporation ability. On this basis, the present invention has been made.

Thus, an object of the present invention is to provide a bisphenol metal complex.

Another object of the present invention is to provide a method for preparing the bisphenol metal complex.

Still another object of the present invention is to provide the use of the bisphenol metal complex as a component of a catalyst system in olefin polymerization.

DETAILED DESCRIPTION OF PREFERRED EMBODIMENTS

Various specific embodiments, versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

For the purposes of this invention and the claims thereto, the new numbering scheme for the Periodic Table Groups is used as described in Chemical and Engineering News, 63 (5), pg. 27 (1985).

As used herein, the term "substituting" or "substituted" means that one or more hydrogen atoms on the group in question is replaced with a $C_1$-$C_6$ alkyl, phenyl, benzyl, a halogen atom, a heteroatom, a heteroatom-containing group such as $C_1$-$C_6$ alkoxy, or a carbon atom in main chain is replaced by a heteroatom. Examples of substituents include, but are not limited to, methyl, ethyl, propyl, isopropyl, butyl, isobutyl, pentyl, isopentyl, hexyl, cyclopentyl, cyclohexyl, phenyl, benzyl, fluorine, chlorine, bromine, iodine, methoxy, and ethoxy.

As used herein, the term "halogen" or "halogen atom" refers to at least one of fluorine, chlorine, bromine, and iodine.

As used herein, the term "heteroatom" refers to at least one of O, S, N, P, B, Si, Ge and Sn.

As used herein, the term "polymerization" encompasses homopolymerization and copolymerization. As used herein, the term "polymer" encompasses homopolymers, copolymers and terpolymers.

As used herein, the term "catalyst component" refers to main catalyst component or procatalyst, which, together with a conventional cocatalyst such as an alkyl aluminum and an optional external electron donor, constitutes a catalyst for olefin polymerization (such a combination is also referred to as catalyst system in the art).

In a first aspect, the present disclosure provides a bisphenol metal complex having a structure represented by Formula I:

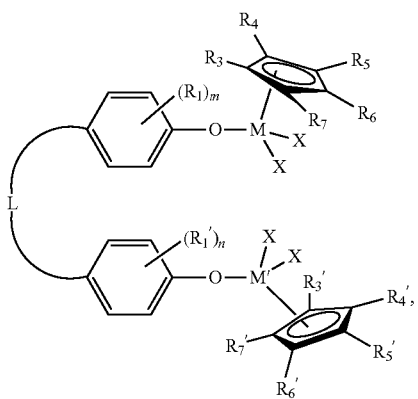

Formula I wherein $R_1$ and $R_1'$ are each independently selected from the group consisting of hydrogen and substituted or unsubstituted $C_1$-$C_{20}$ hydrocarbyl; $R_3$-$R_7$, $R_3'$-$R_7'$ are each independently selected from the group consisting of hydrogen and substituted or unsubstituted $C_1$-$C_{20}$ hydrocarbyl, and any two adjacent groups of $R_3$-$R_7$ are optionally joined to form a ring, and any two adjacent groups of $R_3'$-$R_7'$ are optionally joined to form a ring; M and M' are each independently a Group 4 metal; each X is independently selected from the group consisting of hydrocarbyl having 1 to 20 carbon atoms, hydride, amido, alkoxide, alkyl sulfide, alkyl phosphide, halide, diene, amine, phosphine, ether, and combinations thereof; m and n are independently an integer of from 1 to 4; and L is a divalent linking group.

In some embodiments, the divalent linking group L is a divalent hydrocarbyl or a divalent linking group in substantial hydrocarbon nature, having 1-30 carbon atoms. As used herein, the term "divalent linking group in substantial hydrocarbon nature" refers to a divalent group exhibiting hydrocarbon properties as a whole. Such a group allows one or more heteroatoms to be included in the hydrocarbon chain, but does not have an active hydrogen. The divalent linking group L useful in the present invention can be selected from the group consisting of C1-C30 alkylene, C1-C30 heteroalkylene, C5-C30 cycloalkylene, C4-C30 heterocycloalkylene, C2-C30 alkenylene, C2-C30 heteroalkenylene, C4-C30 cycloalkenylene, C4-C30 heterocycloalkenylene, C2-C30 alkynylene, C2-C30 heteroalkynylene, C6-C30 arylene, and C4-C30 heteroarylene. Examples of L include, but are not limited to, methylene, 1,2-ethylene, 1,3-propylene, 1,2-cyclopentandiyl, 1,3-cyclopentandiyl, 1,2-cyclohexandiyl, 1,3-cyclohexandiyl, 1,4-cyclohexandiyl, 1,2-phenylene, 1,3-phenylene, 1,4-phenylene, 1,8-naphthylene, 1,8-anthrylene, 1,8-fluorenylene, 1,8-carbazolylidene, 4,5-acridinediyl, 4H-dibenzopyran-1,9-diyl, and corresponding groups which have one or more alkyl substituents such as C1-C6 alkyl substituents on the carbon chain and/or ring of the above-mentioned groups.

In some preferred embodiments, the bisphenol metal complex of the present disclosure has a structure represented by Formula Ia:

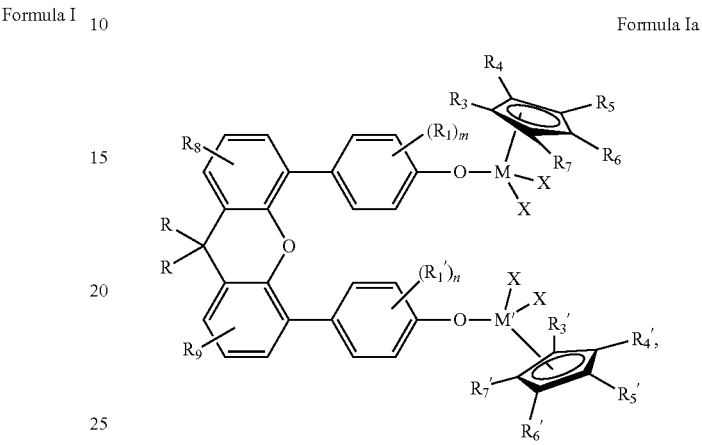

Formula Ia wherein, $R_1$ and $R_1'$ are each independently selected from the group consisting of hydrogen and substituted or unsubstituted $C_1$-$C_{20}$ hydrocarbyl; $R_3$-$R_7$, $R_3'$-$R_7'$ are each independently selected from the group consisting of hydrogen and substituted or unsubstituted $C_1$-$C_{20}$ hydrocarbyl, and any two adjacent groups of $R_3$-$R_7$ are optionally joined to form a ring, and any two adjacent groups of $R_3'$-$R_7'$ are optionally joined to form a ring; $R_8$ and $R_9$ are are each independently selected from the group consisting of hydrogen and substituted or unsubstituted $C_1$-$C_{20}$ hydrocarbyl; each R is independently selected from the group consisting of hydrogen and substituted or unsubstituted $C_1$-$C_{20}$ hydrocarbyl; M and M' are each independently a Group 4 metal; each X is independently selected from the group consisting of hydrocarbyl having 1 to 20 carbon atoms, hydride, amido, alkoxide, alkyl sulfide, alkyl phosphide, halide, diene, amine, phosphine, ether, and combinations thereof; and m and n are independently an integer of from 1 to 4.

In some preferred embodiments, the bisphenol metal complex of the present disclosure has a structure represented by Formula Ib:

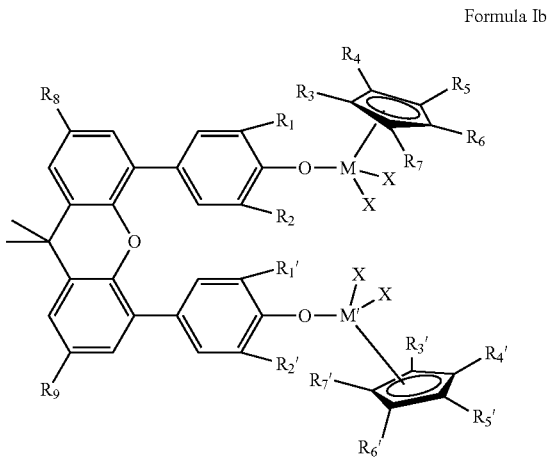

Formula Ib wherein, $R_1$, $R_1'$, $R_2$, $R_2'$ are each independently selected from the group consisting of hydrogen and substituted or unsubstituted $C_1$-$C_{20}$ hydrocarbyl; $R_3$-$R_7$, $R_3'$-$R_7'$ are each independently selected from the group consisting of hydrogen and substituted or unsubstituted $C_1$-$C_{20}$ hydrocarbyl, and any two adjacent groups of $R_3$-$R_7$ are optionally joined to form a ring, and any two adjacent groups of $R_3'$-$R_7'$ are optionally joined to form a ring; $R_8$ and $R_9$ are each independently selected from the group consisting of hydrogen and substituted or unsubstituted $C_1$-$C_{20}$ hydrocarbyl; M and M' are each independently a Group 4 metal; each X is independently selected from the group consisting of hydrocarbyl having 1 to 20 carbon atoms, hydride, amido, alkoxide, alkyl sulfide, alkyl phosphide, halide, diene, amine, phosphine, ether, and combinations thereof.

In some preferred embodiments, in Formulae I, Ia and Ib, $R_1$, $R_1'$, $R_2$, $R_2'$ are each independently selected from the group consisting of hydrogen, substituted or unsubstituted, linear or branched $C_1$-$C_{20}$ alkyl and substituted or unsubstituted $C_6$-$C_{20}$ aryl, preferably from the group consisting of hydrogen and substituted or unsubstituted, linear or branched $C_1$-$C_{10}$ alkyl, and more preferably from the group consisting of hydrogen and substituted or unsubstituted, linear or branched $C_1$-$C_6$ alkyl.

In some preferred embodiments, in Formulae I, Ia and Ib, $R_3$-$R_7$, $R_3'$-$R_7'$ are each independently selected from the group consisting of hydrogen and substituted or unsubstituted, linear or branched $C_1$-$C_{20}$ alkyl, preferably from the group consisting of hydrogen and substituted or unsubstituted, linear or branched $C_1$-$C_{10}$ alkyl, and more preferably from the group consisting of hydrogen and substituted or unsubstituted, linear or branched $C_1$-$C_6$ alkyl.

In some preferred embodiments, in Formulae Ia and Ib, $R_8$ and $R_9$ are each independently selected from the group consisting of hydrogen and substituted or unsubstituted, linear or branched $C_1$-$C_{20}$ alkyl, preferably from the group consisting of hydrogen and substituted or unsubstituted, linear or branched $C_1$-$C_{10}$ alkyl, and more preferably from the group consisting of hydrogen and substituted or unsubstituted, linear or branched $C_1$-$C_6$ alkyl.

In some preferred embodiments, in Formulae I, Ia and Ib, M and M' are each independently selected from the group consisting of titanium, zirconium and hafnium, preferably is titanium.

In some preferred embodiments, in Formulae I, Ia and Ib, each X is independently selected from the group consisting of methyl, fluoride, chloride, bromide and iodide, and preferably is methyl or chloride.

In some embodiments, the bisphenol metal complex is at least one of the following complexes represented by Formula Ib:

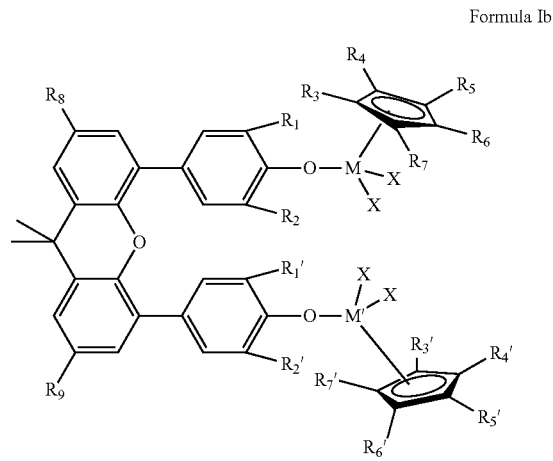

Formula Ib bisphenol metal complex 1: $R_1=R_2=R_1'=R_2'=Me$, $R_3=R_4=R_5=R_6=R_7=R_3'=R_4'=R_5'=R_6'=R_7'=R_8'=R_8=R_9=H$, $M=M'=Ti$, $X=Cl$;

bisphenol metal complex 2: $R_1=R_2=R_1'=R_2'=Et$, $R_3=R_4=R_5=R_6=R_7=R_3'=R_4'=R_5'=R_6'=R_7'=R_8=R_9=H$, $M=M'=Ti$, $X=Cl$;

bisphenol metal complex 3: $R_1=R_2=R_1'=R_2'=iPr$, $R_3=R_4=R_5=R_6=R_7=R_3'=R_4'=R_5'=R_6'=R_7'=R_8=R_9=H$, $M=M'=Ti$, $X=Cl$;

bisphenol metal complex 4: $R_1=R_2=R_1'=R_2'=tBu$, $R_3=R_4=R_5=R_6=R_7=R_3'=R_4'=R_5'=R_6'=R_7'=R_8=R_9=H$, $M=M'=Ti$, $X=Cl$;

bisphenol metal complex 5: $R_1=R_2=R_1'=R_2'=Me$, $R_3=R_4=R_5=R_6=R_7=R_3'=R_4'=R_5'=R_6'=R_7'=Me$, $R_8=R_9=H$, $M=M'=Ti$, $X=Cl$;

bisphenol metal complex 6: $R_1=R_2=R_1'=R_2'=Et$, $R_3=R_4=R_5=R_6=R_7=R_3'=R_4'=R_5'=R_6'=R_7'=Me$, $R_8=R_9=H$, $M=M'=Ti$, $X=Cl$;

bisphenol metal complex 7: $R_1=R_2=R_1'=R_2'=iPr$, $R_3=R_4=R_5=R_6=R_7=R_3'=R_4'=R_5'=R_6'=R_7'=Me$, $R_8=R_9=H$, $M=M'=Ti$, $X=Cl$;

bisphenol metal complex 8: $R_1=R_2=R_1'=R_2'=tBu$, $R_3=R_4=R_5=R_6=R_7=R_3'=R_4'=R_5'=R_6'=R_7'=Me$, $R_8=R_9=H$, $M=M'=Ti$, $X=Cl$;

and corresponding compounds where X=methyl.

In a second aspect, the present invention provides a method for preparing the above-described bisphenol metal complex, comprising the steps of:

1) reacting a corresponding bisphenol compound with a strong base to form a bisphenol di-salt; and
2) reacting the bisphenol di-salt with a metal complex represented by Formula V to obtain the bisphenol metal complex represented by Formula I,

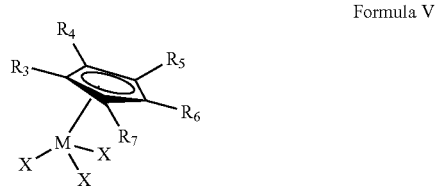

Formula V wherein, $R_3$-$R_7$, M and X have the same meanings as defined above for Formula I.

In some specific embodiments, the present invention provides a method for preparing the above-described bisphenol metal complex represented by Formula Ib, comprising the steps of:
1) reacting a bisphenol compound represented by Formula II with a metal compound represented by Formula III to obtain a bisphenol di-salt represented by Formula IV; and
2) reacting the bisphenol di-salt compound represented by Formula IV with a metal complex represented by Formula V to obtain the bisphenol metal complex represented by Formula Ib;

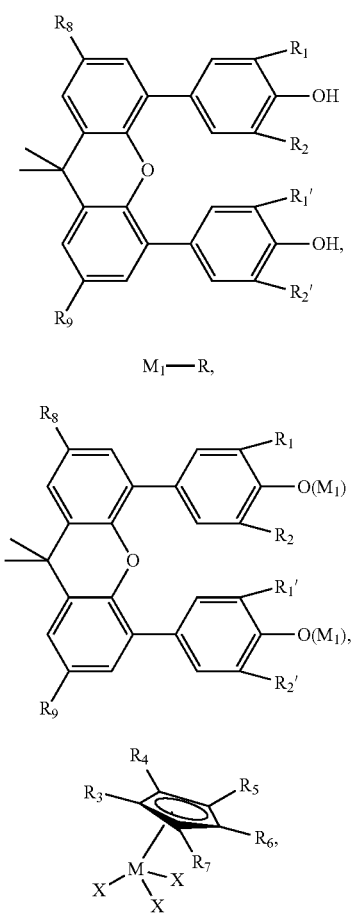

Formula II

Formula III

Formula IV

Formula V wherein, in Formulae II and IV, $R_1$, $R_1'$, $R_2$, $R_2'$, $R_8$ and $R_9$ have the same meanings as defined above for Formula Ib;
in Formula III, $M_1$ is a Group IA metal, preferably lithium, sodium or potassium, and R is hydrogen or a linear or branched $C_1$-$C_{10}$ alkyl; and
in Formula V, $R_3$-$R_7$, M and X have the same meanings as defined above for Formula Ib.

In some preferred embodiments of the invention, the preparation method comprises: reacting the bisphenol compound represented by Formula II with the metal compound represented by Formula III in an organic solvent to obtain the bisphenol di-salt compound represented by Formula IV; then, reacting the bisphenol di-salt compound with the metal complex represented by Formula V in an organic solvent to obtain the bisphenol metal complex represented by Formula Ib.

According to some embodiments of the invention, the organic solvent is selected from tetrahydrofuran, diethyl ether, 1,4-dioxane, and dichloromethane.

In some preferred embodiments of the invention, the bisphenol compound is at least one of the following bisphenol compounds represented by Formula II:

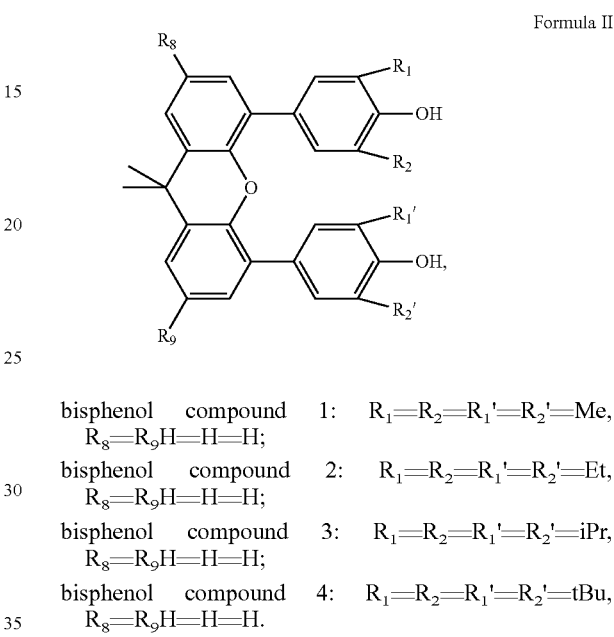

Formula II bisphenol compound 1: $R_1$=$R_2$=$R_1'$=$R_2'$=Me, $R_8$=$R_9$H=H=H;
bisphenol compound 2: $R_1$=$R_2$=$R_1'$=$R_2'$=Et, $R_8$=$R_9$H=H=H;
bisphenol compound 3: $R_1$=$R_2$=$R_1'$=$R_2'$=iPr, $R_8$=$R_9$H=H=H;
bisphenol compound 4: $R_1$=$R_2$=$R_1'$=$R_2'$=tBu, $R_8$=$R_9$H=H=H.

In some preferred embodiments of the invention, the metal compound represented by Formula III is at least one selected from KH, NaH, MeLi, EtLi, PrLi and BuLi.

In some preferred embodiments of the invention, the compound represented by Formula IV is at least one of the following compounds:

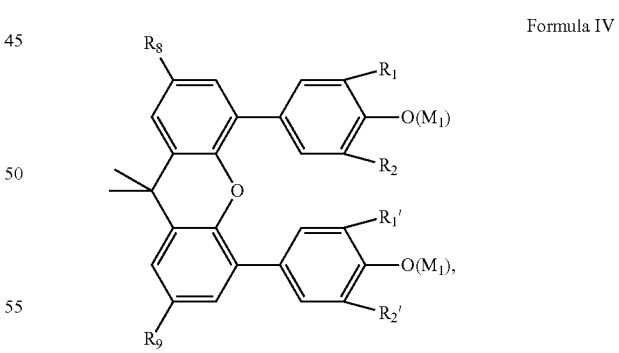

Formula IV phenoxide compound 1: $R_1$=$R_2$=$R_1'$=$R_2'$=Me, $R_8$=$R_9$H=H, $M_1$=Li=Li;
phenoxide compound 2: $R_1$=$R_2$=$R_1'$=$R_2'$=Et, $R_8$=$R_9$H=H, $M_1$=Li;
phenoxide compound 3: $R_1$=$R_2$=$R_1'$=$R_2'$=iPr, $R_8$=$R_9$H=H, $M_1$=Li;
phenoxide compound 4: $R_1$=$R_2$=$R_1'$=$R_2'$=tBu, $R_8$=$R_9$H=H, $M_1$=Li;

phenoxide compound 5: $R_1=R_2=R_1'=R_2'=Me$, $R_8=R_9H=H$, $M_{132}=Na$;
phenoxide compound 6: $R_1=R_2=R_1'=R_2'=Et$, $R_8=R_9H=H$, $M_1=Na$;
phenoxide compound 7: $R_1=R_2=R_1'=R_2'=iPr$, $R_8=R_9H=H$, $M_1=Na$;
phenoxide compound 8: $R_1=R_2=R_1'=R_2'=tBu$, $R_8=R_9H=H$, $M_1=Na$;
phenoxide compound 9: $R_1=R_2=R_1'=R_2'=Me$, $R_8=R_9H=H$, $M_1=K$;
phenoxide compound 10: $R_1=R_2=R_1'=R_2'=Et$, $R_8=R_9H=H$, $M_1=K$;
phenoxide compound 11: $R_1=R_2=R_1'=R_2'=iPr$, $R_8=R_9H=H$, $M_1=K$;
phenoxide compound 12: $R_1=R_2=R_1'=R_2'=tBu$, $R_8=R_9H=H$, $M_1=K$.

In some preferred embodiments of the invention, the metal compound represented by Formula V is at least one of the following metal complexes:

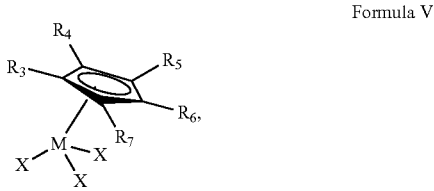

Formula V metal complex 1: $R_3=R_4=R_5=R_6=R_7H=H$, $M=Ti$, $X=Cl$;
metal complex 2: $R_3=R_4=R_5=R_6=R_7=Me$, $M=Ti$, $X=Cl$.

In some preferred embodiments of the inventive method, a molar ratio of the bisphenol compound represented by Formula II to the compound represented by Formula III is 1:(1-20), for example, 1:2.5, 1:3, 1:3.5, 1:4, 1:4.5, 1:5, 1:5.5, 1:6, 1:6.5, 1:7, 1:7.5, 1:8, 1:8.5, 1:9, 1:9.5, 1:10, 1:10.5, 1:11, 1:11.5, 1:12, 1:12.5, 1:13, 1:13.5, 1:14, 1:14.5, 1:15, 1:15.5, 1:16, 1:16.5, 1:17, 1:17.5, 1:18, 1:18.5, 1:19, 1:19.5, 1:20 and any value therebetween, preferably 1:(2-10), and more preferably 1:(4-8).

In some preferred embodiments of the inventive method, a reaction temperature for the reaction between the bisphenol compound represented by Formula II and the compound represented by Formula III is from −78° C. to 60° C., for example, −60° C., −50° C., −40° C., −30° C., −20° C., −10° C., 0° C., 10° C., 20° C., 30° C., and any value therebetween, and preferably from −10° C. to 40° C.

In some preferred embodiments of the inventive method, a reaction time for the reaction between the bisphenol compound represented by Formula II and the compound represented by Formula III is from 1 to 10 hours, for example, 1.5, 2, 2.5, 3, 3.5, 4, 4.5, 5, 5.5, 6, 6.5, 7, 7.5, 8, 8.5, 9, 9.5 hours and any value therebetween, and preferably from 1.5 to 3 hours.

In some preferred embodiments of the inventive method, a molar ratio of the compound represented by Formula IV to the metal compound represented by Formula V is 1:(1.8-2.4), for example, 1:1.9, 1:2, 1:2.1, 1:2.2, 1:2.3, 1:2.4, and any value therebetween, and preferably 1:2. Simply, the number of moles of the bisphenol compound can be regarded as the number of moles of the compound represented by Formula IV.

In some preferred embodiments of the inventive method, a reaction temperature for the reaction between the compound represented by Formula IV and the metal compound represented by Formula V is from −78° C. to 60° C., for example, −60° C., −50° C., −40° C., −30° C., −20° C., −10° C., 0° C., 10° C., 20° C., 30° C., and any value therebetween, and preferably from −10° C. to 40° C.

In some preferred embodiments of the inventive method, a reaction time for the reaction between the compound represented by Formula IV and the metal compound represented by Formula V is from 6 to 24 hours, for example, 6, 7, 8, 9, 10, 11, 12, 13, 14, 15, 16, 17, 18, 19, 20, 21, 22, 23, 24 hours and any value therebetween, and preferably from 6 to 19 hours.

In a third aspect, the present invention provides the use of the above-described bisphenol metal complex in olefin polymerization, wherein the bisphenol metal complex is used as a main catalyst (or a catalyst compound) of an olefin polymerization catalyst.

In some embodiments, the olefin polymerization catalyst further comprises a cocatalyst selected from organoaluminum compounds and organoboron compounds.

EXAMPLES

The present invention will be further described below in conjunction with specific examples, but the examples do not constitute any limitation on the present invention.

Evaluation and test methods involved in the following examples are as follows:

1. The proton nuclear magnetic spectra and carbon nuclear magnetic spectra are recorded at 110° C. on a Bruker-300 nuclear magnetic resonance instrument with deuterated chloroform as the solvent.

2. High-resolution mass spectra are recorded on Bruker ESI-Q/TOF MS mass spectrometer using acetonitrile as a dispersing solvent.

3. Polymerization activity: A polymer obtained by polymerization is dried and weighed, and dividing the weight of the polymer by the amount of catalyst added during polymerization gives the catalyst activity.

4. Molecular weight and molecular weight distribution PDI (PDI=Mw/Mn) of polymer: measured by using PL-GPC220 at 150° C., with 1,2,4-trichlorobenzene as solvent (standards: PS; flow rate: 1.0 mL/min; Column: 3×Plgel 10 um M1×ED-B 300×7.5 nm).

5. The melting point of the polymer is determined by differential scanning calorimetry (DSC) as follows: A 10 mg sample is placed in a crucible and measured on a METTLER DSC1 differential scanning calorimeter. Under nitrogen atmosphere, the temperature is increased from −70° C. to 200° C. at a ramp rate of 10° C./min and maintained for 1 min, and then the temperature is reduced to −70° C. at a rate of 10° C./min and maintained for 3 minutes. Then, the temperature is increased to 200° C. at a rate of 10° C./min again, and the data of the second heating scan are recorded.

6. The content of comonomer in the polymer is determined through high temperature nuclear magnetic carbon spectrum.

Example 1—Preparation of Bisphenol Metal Complex 7

Bisphenol compound 3 (2.24 mmol) was dissolved in diethyl ether solvent, and neat KH solid (8.96 mmol) was added to the resulting solution at −78° C. After reacting for 1 hour, the reaction mixture was warmed to room temperature, and the reaction was then continued for further 2 hours. Next, the solution was transferred to a solution of metal complex 2 (4.48 mmol) in dichloromethane at −78° C. through a transfer conduct. After reacting at that temperature for 1 hour, the reaction mixture was gradually warmed to room temperature, and the reaction was then continued for further 12 hours. Upon the completion of the reaction, the solvent was removed with a vacuum line, and the residue was washed with dichloromethane and filtered through Celite. The filtrate was evaporated to dry under vacuum, and the crude product was recrystallized with dichloromethane/n-hexane to afford an orange target product at a yield of 90 %. Characterization data are as follows:

$^1$H NMR (CDCl$_3$, 400 MHz): δ=7.45 (dd, J=7.6, 2.0 Hz, 2H, aryl-H), 7.25 (s, 4H, aryl-H), 7.14 -7.21 (m, 4H, aryl-H), 3.13 (m, 4H, CH), 2.18 (s, 30H, CH$_3$), 1.80 (s, 6H, CH$_3$), 1.03 (d, J=6.8 Hz, 24 H, CH$_3$).

$^{13}$C NMR (CDCl$_3$, 100 MHz): δ=159.1, 146.9, 138.9, 133.5, 132.8, 130.6, 130.4, 130.0, 124.5, 122.9, 34.3, 33.9, 26.3, 24.3, 13.1.

ESI-MS for C$_{59}$H$_{72}$Cl$_4$O$_3$Ti$_2$: M=1064.34.

Example 2—Preparation of Bisphenol Metal Complex 4

Bisphenol compound 4 (2.00 mmol) was dissolved in tetrahydrofuran solvent, and neat NaH solid (12.00 mmol) was added to the resulting solution at −10° C. After reacting for 1 hour, the reaction mixture was warmed to room temperature, and the reaction was then continued for further 1 hour. Next, the solution was transferred to a solution of metal complex 1 (4.00 mmol) in tetrahydrofuran at −10° C. through a transfer conduct. After reacting at that temperature for 0.5 hours, the reaction mixture was gradually warmed to room temperature, and the reaction was then continued for further 8 hours. Upon the completion of the reaction, the solvent was removed with a vacuum line, and the residue was washed with dichloromethane and filtered through Celite. The filtrate was evaporated to dry under vacuum, and the crude product was recrystallized with dichloromethane/n-hexane to afford an orange target product at a yield of 92 %.

Characterization data are as follows: ESI-MS for C$_{51}$H$_{56}$Cl$_4$O$_3$Ti$_2$: M/Z=954.21

Example 3—Preparation of Bisphenol Metal Complex A

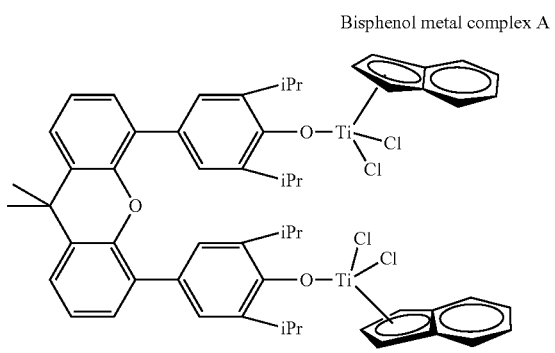

Bisphenol metal complex A

Bisphenol compound 3 (2.24 mmol) was dissolved in diethyl ether solvent, and n-BuLi (4.48 mmol, 1.6 mol/L) was added to the resulting solution at −78° C. After reacting for 1 hour, the reaction mixture was warmed to room temperature, and the reaction was then continued for further 2 hours. Next, the solution was transferred to a solution of indenyl titanium complex (4.48 mmol) in diethyl ether at −78° C. through a transfer conduct. After reacting at that temperature for 1 hour, the reaction mixture was gradually warmed to room temperature, and the reaction was then continued for further 12 hours. Upon the completion of the reaction, the solvent was removed with a vacuum line, and the residue was washed with dichloromethane and filtered through Celite. The filtrate was evaporated to dry under vacuum, and the crude product was recrystallized with dichloromethane/n-hexane to afford a purple-red target product at a yield of 60 %.

$^1$H NMR (CDCl$_3$, 400 MHz): δ=7.74 (dd, J=6.4, 2.8 Hz, 4H, aryl-H), 7.47 (t, J=4.8 Hz, 2H, aryl-H), 7.37 (dd, J=6.4, 2.8 Hz, 4H, aryl-H), 7.22 (s, 4H, aryl-H), 7.18 (d, J=4.8 Hz, 4H, aryl-H), 6.78 (d, J=3.6 Hz, 4H, aryl-H), 6.42 (t, J=3.2 Hz, 2H, aryl-H), 3.25 (sept, 4H, CH), 2.18 (s, 30H, CH$_3$), 1.82 (s, 6H, CH$_3$), 1.08 (d, J=6.8 Hz, 24H, CH$_3$).

$^{13}$C NMR (CDCl$_3$, 100 MHz): δ=164.5, 146.8, 138.5, 134.6, 130.6, 130.3, 129.9, 129.7, 128.3, 125.9, 125.8, 124.5, 123.0, 120.4, 113.3, 34.2, 34.0, 26.8, 23.8

Example 4—Preparation of Bisphenol Metal Complex B

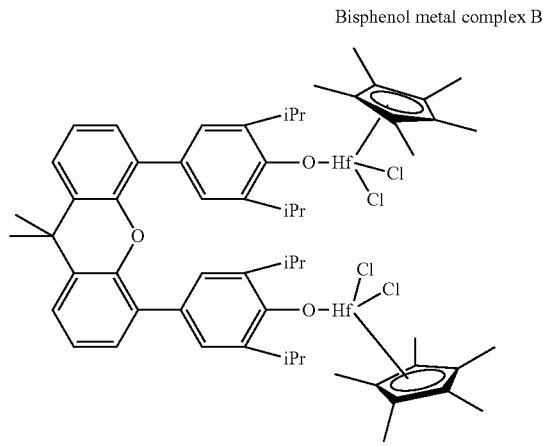

Bisphenol metal complex B

Bisphenol compound 3 (1.00 mmol) was dissolved in tetrahydrofuran solvent, and n-BuLi (2.00 mmol, 1.6 mol/L) was added to the resulting solution at −78° C. After reacting for 1 hour, the reaction mixture was warmed to room temperature, and the reaction was then continued for further 2 hours. Next, the solution was transferred to a solution of pentamethylcyclopentadienyl hafnium complex (2.00 mmol) in tetrahydrofuran at −78° C. through a transfer conduct. After reacting at that temperature for 1 hour, the reaction mixture was gradually warmed to room temperature and then heated to 50° C., and the reaction was then continued for further 12 hours. Upon the completion of the reaction, the solvent was removed with a vacuum line, and the residue was washed with dichloromethane and filtered through Celite. The filtrate was evaporated to dry under vacuum, and the crude product was recrystallized with dichloromethane/n-hexane to afford a purple target product at a yield of 21 %.

$^1$H NMR (CDCl$_3$, 400 MHz): δ=7.40 (dd, J=7.4, 2.2 Hz, 2H, aryl-H), 7.16 -7.11 (m, 4H, aryl-H), 7.08 (s, 4H, aryl-H), 2.93 (sept, 4H, CH), 2.22 (s, 30H, CH$_3$), 1.77 (s, 6H, CH$_3$), 1.04 (d, J=6.8 Hz, 24H, CH$_3$).

Example 5

After having been dried by heating, a 500 mL polymerization autoclave was evacuated and then filled with nitrogen gas twice, following by evacuating and then filling with ethylene gas once. Then, 10 mL of 2 mmol/mL solution of methylaluminoxane (MAO) in toluene, 150 mL of n-hexane having subjected to de-oxygenation and de-watering treatment, and 1 mL of a 5 μmol/mL solution of bisphenol metal complex 7 in toluene were added successively. With mechanical stirring, ethylene under a pressure of 1.0 MPa was introduced thereinto, and the reaction was allowed to continue at 20° C. under that pressure for 20 minutes, and then ethanol was added to terminate the reaction. 2.8 g of polyethylene polymer was obtained. The polymerization activity was calculated as 8.4×10$^5$ g·mol$^{-1}$(Ti)·h$^{-1}$. The melting point measured by DSC was 133.5° C.; the Mw measured by GPC was 1.9×10$^5$, and the Mw/Mn was found to be 4.82.

Example 6

After having been dried by heating, a 500 mL polymerization autoclave was evacuated and then filled with nitrogen gas twice, following by evacuating and then filling with ethylene gas once. Then, 2 mL of a 0.5 mmol/mL solution of triisobutylaluminum in n-hexane, 150 mL of n-hexane having subjected to de-oxygenation and de-watering treatment, and 1 mL of a 2.5 μmol/mL solution of bisphenol metal complex 7 in toluene were added successively, followed by the addition of 2 mL (5 μmol/mL) of a boron-containing reagent, [Ph$_3$C][B(C$_6$F$_5$)$_4$]. With mechanical stirring, ethylene under a pressure of 1.0 MPa was introduced thereinto, and the reaction was allowed to continue at 80° C. under that pressure for 20 minutes, and then ethanol was added to terminate the reaction. 5.1 g of polyethylene polymer was obtained. The polymerization activity was calculated as 3.06×10$^6$ g·mol$^{-1}$(Ti)·h$^{-1}$. The melting point measured by DSC was 133.3° C.; the Mw measured by GPC was 1.8×10$^5$, and the Mw/Mn was found to be 6.84.

Example 7

After having been dried by heating, a 500 mL polymerization autoclave was evacuated and then filled with nitrogen gas twice, following by evacuating and then filling with ethylene gas once. Then, 6.8 ml of a solution (10 % by mass) of methylaluminoxane (MAO) in toluene, 15 ml of 1-hexene, 150 mL of n-hexane having subjected to de-oxygenation and de-watering treatment, and 2 mL of a 2.5 μmol/mL solution of bisphenol metal complex 7 in toluene were added successively. With mechanical stirring, ethylene under a pressure of 3 atm was introduced thereinto, and the reaction was allowed to continue at 25° C. under that pressure for 20 minutes, and then ethanol was added to terminate the reaction. 5.21 g of a polymer was obtained. The activity was calculated as 1.56×10$^6$ g·mol$^{-1}$(Ti)·h$^{-1}$. The melting point measured by DSC was 103° C.; the Mw measured by GPC was 1.9×10$^5$, and the Mw/Mn was found to be 1.92 . The molar content of 1-hexene was found via high temperature nuclear magnetic carbon spectrum to be 5.3%.

Example 8

After having been dried by heating, a 500 mL polymerization autoclave was evacuated and then filled with nitrogen gas twice, following by evacuating and then filling with ethylene gas once. Then, 2 mL of a 0.5 mmol/mL solution of triisobutylaluminum in n-hexane, 150 mL of n-hexane having subjected to de-oxygenation and de-watering treatment, and 2 mL of a 2.5 μmol/mL solution of bisphenol metal complex A in toluene were added successively, followed by the addition of 3 mL (5 μmol/mL) of a boron-containing reagent, [Ph$_3$C][B(C$_6$F$_5$)$_4$]. With mechanical stirring, ethylene under a pressure of 0.4 MPa was introduced thereinto, and the reaction was allowed to continue at 40° C. under that pressure for 10 minutes, and then ethanol was added to terminate the reaction. 1.3 g of a polyethylene polymer was obtained. The polymerization activity was calculated as 7.8×10$^5$ g·mol$^{-1}$(Ti)·h$^{-1}$. The melting point measured by DSC was 130.0° C.; the Mw of the polyethylene measured by GPC was 3.4×10$^5$, and the Mw/Mn was found to be 8.53.

Example 9

After having been dried by heating, a 500 mL polymerization autoclave was evacuated and then filled with nitrogen gas twice, following by evacuating and then filling with ethylene gas once. Then, 2 mL of a 0.5 mmol/mL solution of triisobutylaluminum in n-hexane, 9.3 mL of 1-octene, 150 mL of n-hexane having subjected to de-oxygenation and de-watering treatment, and 2 mL of a 2.5 μmol/mL solution of bisphenol metal complex A in toluene were added successively, followed by the addition of 3 mL (5 μmol/mL) of a boron-containing reagent, [Ph$_3$C][B(C$_6$F$_5$)$_4$]. With mechanical stirring, ethylene under a pressure of 0.4 MPa was introduced thereinto, and the reaction was allowed to continue at 40° C. under that pressure for 10 minutes, and then ethanol was added to terminate the reaction. 2.25 g of a polyethylene polymer was obtained. The activity was calculated as 1.35×10$^6$ g·mol$^{-1}$(Ti)·h$^{-1}$. The melting point measured by DSC was 125.5° C.; the Mw of the polyethylene measured by GPC was 5.6×10$^4$, and the Mw/Mn was found to be 2.91 . The molar content of 1-octene was found via high temperature nuclear magnetic carbon spectrum to be 2.4%.

For any numerical value mentioned in the present invention, if there is only a two-unit interval between any lowest value and any highest value, then all values with one-unit increment from the lowest value to the highest value are included. For example, if the amount of a component, or the value of process variables such as temperature, pressure, time, etc., is stated to be 50-90, then in this specification it means that values such as 51-89, 52-88 . . . 69-71 and 70-71 are specifically enumerated. For non-integer values, 0.1, 0.01, 0.001, or 0.0001 can be suitably considered as one unit. These are just examples specifically mentioned. In this application, in a similar manner, all possible combinations of numerical values between the lowest value and the highest value listed are considered as having been disclosed.

It should be noted that the above-described examples are only used to explain the present invention and do not constitute any limitation to the present invention. The present invention has been described with reference to typical examples, but it should be understood that the words used therein are descriptive and explanatory words, rather than restrictive words. The present invention may be modified within the scope of the claims of the present invention as stipulated, and the present invention may be revised without departing from the scope and spirit of the present invention. Although the present invention described therein relates to specific methods, materials and embodiments, it does not mean that the present invention is limited to the specific examples disclosed therein. On the contrary, the present invention can be extended to all other methods and applications with the same function.

We claim:

1. A bisphenol metal complex having a structure represented by Formula Ia:

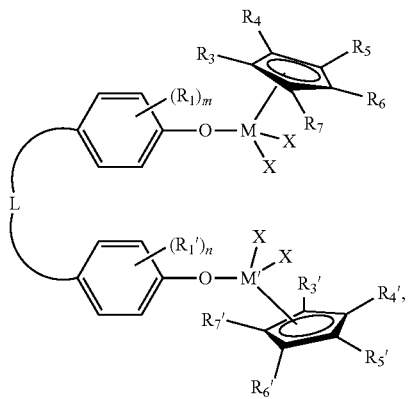

Formula I wherein, $R_1$ and $R_1'$ are each independently selected from the group consisting of hydrogen and substituted or unsubstituted $C_1$-$C_{20}$ hydrocarbyl;

$R_3$ through $R_7$ and $R_3'$ through $R_7'$ are each independently selected from the group consisting of hydrogen and substituted or unsubstituted $C_1$-$C_{20}$ hydrocarbyl, wherein any two adjacent groups of $R_3$ through $R_7$ are optionally joined to form a ring, and/or wherein any two adjacent groups of $R_3'$ through $R_7'$ are optionally joined to form a ring;

$R_8$ and $R_9$ are each independently selected from the group consisting of hydrogen and substituted or unsubstituted $C_1$-$C_{20}$ hydrocarbyl;

each R is independently selected from the group consisting of hydrogen and substituted or unsubstituted $C_1$-$C_{20}$ hydrocarbyl;

M and M' are each independently a Group 4 metal;

each X is independently selected from the group consisting of hydrocarbyl having 1 to 20 carbon atoms, hydride, amido, alkoxide, alkyl sulfide, alkyl phosphide, halide, diene, amine, phosphine, ether, and combinations thereof; and m and n are independently an integer of from 1 to 4.

2. The bisphenol metal complex according to claim 1, which has a structure represented by Formula Ib:

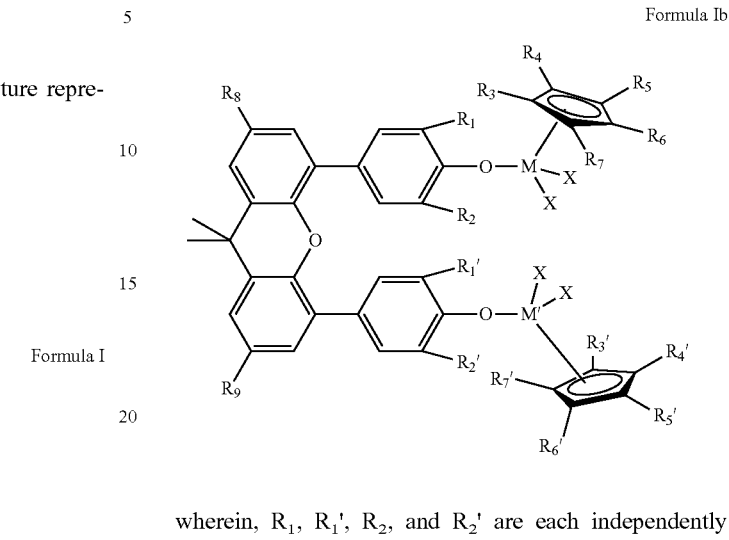

Formula Ib wherein, $R_1$, $R_1'$, $R_2$, and $R_2'$ are each independently selected from the group consisting of hydrogen and substituted or unsubstituted $C_1$-$C_{20}$ hydrocarbyl;

$R_3$ through $R_7$ and $R_3'$ through $R_7'$ are each independently selected from the group consisting of hydrogen and substituted or unsubstituted $C_1$-$C_{20}$ hydrocarbyl, wherein any two adjacent groups of $R_3$ through $R_7$ are optionally joined to form a ring, and/or wherein any two adjacent groups of $R_3'$ through $R_7'$ are optionally joined to form a ring;

$R_8$ and $R_9$ are each independently selected from the group consisting of hydrogen and substituted or unsubstituted $C_1$-$C_{20}$ hydrocarbyl;

M and M' are each independently a Group 4 metal;

each X is independently selected from the group consisting of hydrocarbyl having 1 to 20 carbon atoms, hydride, amido, alkoxide, alkyl sulfide, alkyl phosphide, halide, diene, amine, phosphine, ether, and combinations thereof.

3. The bisphenol metal complex according to claim 2, which is at least one selected from the following complexes represented by Formula Ib:

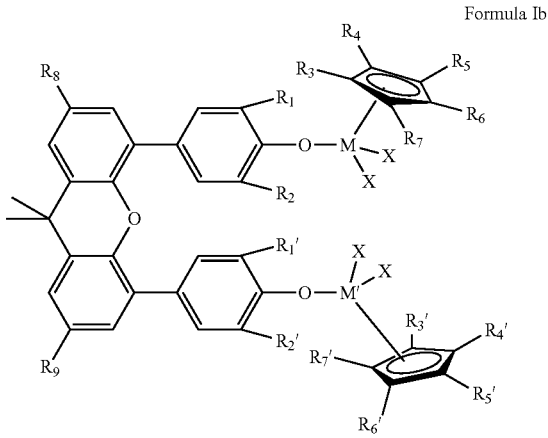

Formula Ib bisphenol metal complex 1, wherein in Formula Ib, $R_1$, $R_2$, $R_1'$ and $R_2'$ are Me; $R_3$, $R_4$, $R_5$, $R_6$, $R_7$, $R_3'$, $R_4'$, $R_5'$, $R_6'$, $R_7'$, $R_8$ and $R_9$ are H; M and M' are Ti; and X is Cl or methyl;

bisphenol metal complex 2, wherein in Formula Ib, $R_1$, $R_2$, $R_1'$ and $R_2'$ are Et; $R_3$, $R_4$, $R_5$, $R_6$, $R_7$, $R_3'$, $R_4'$, $R_5'$, $R_6'$, $R_7'$, $R_8$ and $R_9$ are H; M and M' are Ti; and X is Cl or methyl;

bisphenol metal complex 3, wherein in Formula Ib, $R_1$, $R_2$, $R_1'$ and $R_2'$ are iPr; $R_3$, $R_4$, $R_5$, $R_6$, $R_7$, $R_3'$, $R_4'$, $R_5'$, $R_6'$, $R_7'$, $R_8$ and $R_9$ are H; M and M' are Ti; and X is Cl or methyl;

bisphenol metal complex 4, wherein in Formula Ib, $R_1$, $R_2$, $R_1'$ and $R_2'$ are tBu; $R_3$, $R_4$, $R_5$, $R_6$, $R_7$, $R_3'$, $R_4'$, $R_5'$, $R_6'$, $R_7'$, $R_8$ and $R_9$ are H; M and M' are Ti; and X is Cl or methyl;

bisphenol metal complex 5, wherein in Formula Ib, $R_1$, $R_2$, $R_1'$ and $R_2'$ are Me; $R_3$, $R_4$, $R_5$, $R_6$, $R_7$, $R_3'$, $R_4'$, $R_5'$, $R_6'$ and $R_7'$ are Me; $R_8$ and $R_9$ are H; M and M' are Ti; and X is Cl or methyl;

bisphenol metal complex 6, wherein in Formula Ib, $R_1$, $R_2$, $R_1'$ and $R_2'$ are Et; $R_3$, $R_4$, $R_5$, $R_6$, $R_7$, $R_3'$, $R_4'$, $R_5'$, $R_6'$ and $R_7'$ are Me; $R_8$ and $R_9$ are H; M and M' are Ti; and X is Cl or methyl;

bisphenol metal complex 7, wherein in Formula Ib, $R_1$, $R_2$, $R_1'$ and $R_2'$ are iPr; $R_3$, $R_4$, $R_5$, $R_6$, $R_7$, $R_3'$, $R_4'$, $R_5'$, $R_6'$ and $R_7'$ are Me; $R_8$ and $R_9$ are H; M and M' are Ti; and X is Cl or methyl; and bisphenol metal complex 8, wherein in Formula Ib, $R_1$, $R_2$, $R_1'$ and $R_2'$ are tBu; $R_3$, $R_4$, $R_5$, $R_6$, $R_7$, $R_3'$, $R_4'$, $R_5'$, $R_6'$ and $R_7'$ are Me; $R_8$ and $R_9$ are H; M and M' are Ti; and X is Cl or methyl.

4. A method for preparing the bisphenol metal complex according to claim 1, comprising the steps of:
1) reacting a corresponding bisphenol compound with a strong base to form a bisphenol di-salt; and
2) reacting the bisphenol di-salt with a metal complex represented by Formula V to obtain the bisphenol metal complex represented by Formula Ia,

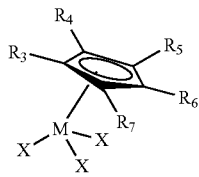

Formula V wherein, $R_3$ through $R_7$, M and X have the same meanings as defined for Formula Ia in claim 1.

5. A method for preparing the bisphenol metal complex according to claim 2, comprising the steps of:
1) reacting a bisphenol compound represented by Formula II with a metal compound represented by Formula III to obtain a bisphenol di-salt represented by Formula IV; and
2) reacting the bisphenol di-salt compound represented by Formula IV with a metal complex represented by Formula V to obtain the bisphenol metal complex represented by Formula Ib;

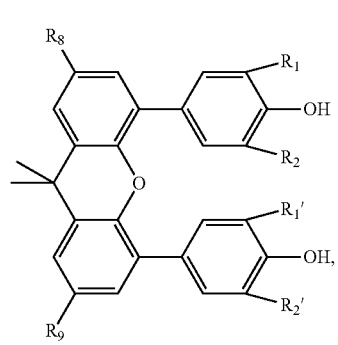

Formula II

Formula III

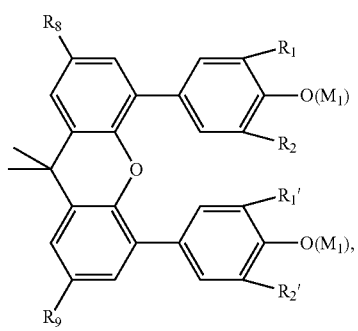

Formula IV

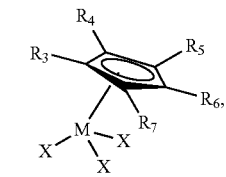

Formula V wherein, in Formulae II and IV, $R_1$, $R_1'$, $R_2$, $R_2'$, $R_8$ and $R_9$ have the same meanings as defined for Formula Ib in claim 2;

in Formula III, $M_1$ is a Group IA metal, and R is hydrogen or a linear or branched $C_1$-$C_{10}$ alkyl; and in Formula V, $R_3$ through $R_7$, M and X have the same meanings as defined for Formula Ib in claim 3.

6. The method according to claim 5, having at least one of the following features:
a molar ratio of the bisphenol compound represented by Formula II to the compound represented by Formula III is 1:(1-20);
a reaction temperature for the reaction between the bisphenol compound represented by Formula II and the compound represented by Formula III is from −78° C. to 60° C.;
a reaction time for the reaction between the bisphenol compound represented by Formula II and the compound represented by Formula III is from 1 to 10 hours;
a molar ratio of the compound represented by Formula IV to the metal compound represented by Formula V is 1:(1.8-2.4);
a reaction temperature for the reaction between the compound represented by Formula IV and the metal compound represented by Formula V is from −78° C. to 60° C.; and
a reaction time for the reaction between the compound represented by Formula IV and the metal compound represented by Formula V is from 6 to 24 hours.

7. The bisphenol metal complex according to claim 1, having at least one of the following features:
  in Formula Ia, $R_1$ and $R_1'$ are each independently selected from the group consisting of hydrogen, substituted or unsubstituted, linear or branched $C_1$-$C_{20}$ alkyl and substituted or unsubstituted $C_6$-$C_{20}$ aryl, preferably from the group consisting of hydrogen and substituted or unsubstituted, linear or branched $C_1$-$C_{10}$ alkyl, and more preferably from the group consisting of hydrogen and substituted or unsubstituted, linear or branched $C_1$-$C_6$ alkyl;
  in Formula Ia, $R_3$ through $R_7$ and $R_3'$ through $R_7'$ are each independently selected from the group consisting of hydrogen and substituted or unsubstituted, linear or branched $C_1$-$C_{20}$ alkyl;
  in Formula Ia, $R_8$ and $R_9$ are each independently selected from the group consisting of hydrogen and substituted or unsubstituted, linear or branched $C_1$-$C_{20}$ alkyl;
  in Formula Ia, M and M' are each independently selected from the group consisting of titanium, zirconium and hafnium; and
  in Formula Ia, each X is independently selected from the group consisting of methyl, fluoride, chloride, bromide and iodide.

8. The bisphenol metal complex according to claim 2, having at least one of the following features:
  in Formula Ib, $R_1$, $R_1'$, $R_2$ and $R_2'$ are each independently selected from the group consisting of hydrogen, substituted or unsubstituted, linear or branched $C_1$-$C_{20}$ alkyl and substituted or unsubstituted $C_6$-$C_{20}$ aryl;
  in Formula Ib, $R_3$ through $R_7$ and $R_3'$ through $R_7'$ are each independently selected from the group consisting of hydrogen and substituted or unsubstituted, linear or branched $C_1$-$C_{20}$ alkyl;
  in Formula Ib, $R_8$ and $R_9$ are each independently selected from the group consisting of hydrogen and substituted or unsubstituted, linear or branched $C_1$-$C_{20}$ alkyl;
  in Formula Ib, M and M' are each independently selected from the group consisting of titanium, zirconium and hafnium; and
  in Formula Ib, each X is independently selected from the group consisting of methyl, fluoride, chloride, bromide and iodide.

9. The bisphenol metal complex according to claim 1, having at least one of the following features:
  in Formula Ia, $R_1$ and $R_1'$ are each independently selected from the group consisting of hydrogen and substituted or unsubstituted, linear or branched $C_1$-$C_6$ alkyl;
  in Formula Ia, $R_3$ through $R_7$ and $R_3'$ through $R_7'$ are each independently selected from the group consisting of hydrogen and substituted or unsubstituted, linear or branched $C_1$-$C_6$ alkyl;
  in Formula Ia, $R_8$ and $R_9$ are each independently selected from the group consisting of hydrogen and substituted or unsubstituted, linear or branched $C_1$-$C_6$ alkyl;
  in Formula Ia, M and M' are titanium; and
  in Formula Ia, each X is independently methyl or chloride.

10. The bisphenol metal complex according to claim 2, having at least one of the following features:
  in Formula Ib, $R_1$, $R_1'$, $R_2$ and $R_2'$ are each independently selected from the group consisting of hydrogen and substituted or unsubstituted, linear or branched $C_1$-$C_6$ alkyl;
  in Formula Ib, $R_3$ through $R_7$ and $R_3'$ through $R_7'$ are each independently selected from the group consisting of hydrogen and substituted or unsubstituted, linear or branched $C_1$-$C_6$ alkyl;
  in Formula Ib, $R_8$ and $R_9$ are each independently selected from the group consisting of hydrogen and substituted or unsubstituted, linear or branched $C_1$-$C_6$ alkyl;
  in Formula Ib, M and M' are titanium; and
  in Formula Ib, each X is independently methyl or chloride.

* * * * *